United States Patent
Shannon

[11] Patent Number: 6,032,917
[45] Date of Patent: Mar. 7, 2000

[54] UMBRELLA HOLDER FOR A GOLF BAG

[76] Inventor: Michael F. Shannon, 120 W. Entiat, Orondo, Wash. 98843

[21] Appl. No.: 08/949,023

[22] Filed: Oct. 10, 1997

Related U.S. Application Data

[60] Provisional application No. 60/028,466, Oct. 11, 1996.

[51] Int. Cl.[7] .................................................. F16M 13/00
[52] U.S. Cl. ............................. 248/514; 248/529; 135/16
[58] Field of Search .................................... 248/96, 219.2, 248/286.1, 291.1, 515, 518, 519, 523, 529, 536, 558; 135/16, 18, 19; D3/5, 10

[56] References Cited

U.S. PATENT DOCUMENTS

| | | | |
|---|---|---|---|
| 276,791 | 5/1883 | Engle | 248/515 |
| D. 330,630 | 11/1992 | Loden | D3/10 |
| D. 338,327 | 8/1993 | Lewis | D3/5 |
| D. 370,336 | 6/1996 | Rosier | D3/5 |
| 970,751 | 9/1910 | Pranke | 248/515 |
| 2,559,421 | 7/1951 | Garrett | 248/515 |
| 3,304,035 | 2/1967 | Davis | 248/40 |
| 3,304,036 | 2/1967 | Davis | 248/514 |
| 3,602,466 | 8/1971 | Drowns | 248/41 |
| 3,866,934 | 2/1975 | Braun | 280/36 C |
| 4,747,569 | 5/1988 | Hoshino | 248/286 |
| 5,277,711 | 1/1994 | Hendershot | 135/16 |
| 5,297,570 | 3/1994 | Conner | 135/16 |
| 5,411,237 | 5/1995 | Daugherty | 248/534 |
| 5,431,364 | 7/1995 | Etter | 248/514 |
| 5,518,218 | 5/1996 | Leonard | 248/530 |
| 5,579,795 | 12/1996 | Colbo, Jr. | 135/88.01 |

FOREIGN PATENT DOCUMENTS

| | | |
|---|---|---|
| 0515139 | 5/1992 | European Pat. Off. . |
| 359459 | 11/1931 | United Kingdom . |
| 2045338 | 10/1980 | United Kingdom . |

*Primary Examiner*—Ramon O. Ramirez
*Assistant Examiner*—Gwendolyn Baxter
*Attorney, Agent, or Firm*—David S. Thompson

[57] ABSTRACT

A preferred version of the umbrella holder 10 provides a support rod 20 having two fastening blocks which slide within an axial channel inside the support rod to adjust the rod to attach to the inside of a golf bag 100. An adjustment support 40 is releasably attachable to the support rod, thereby allowing the golf bag to be used only with the support rod attached when use of the umbrella is not desired. An umbrella support 70 is pivotably adjustable with respect to the adjustment support, allowing the angle of the umbrella handle to be altered, as desired, and to compensate for the angle of the golf bag when supported by its legs or cart. A spring biases the teeth of the adjustment support away from the teeth of the umbrella support when a connecting bolt is loosened, thereby allowing convenient alteration of the angle of support.

3 Claims, 6 Drawing Sheets

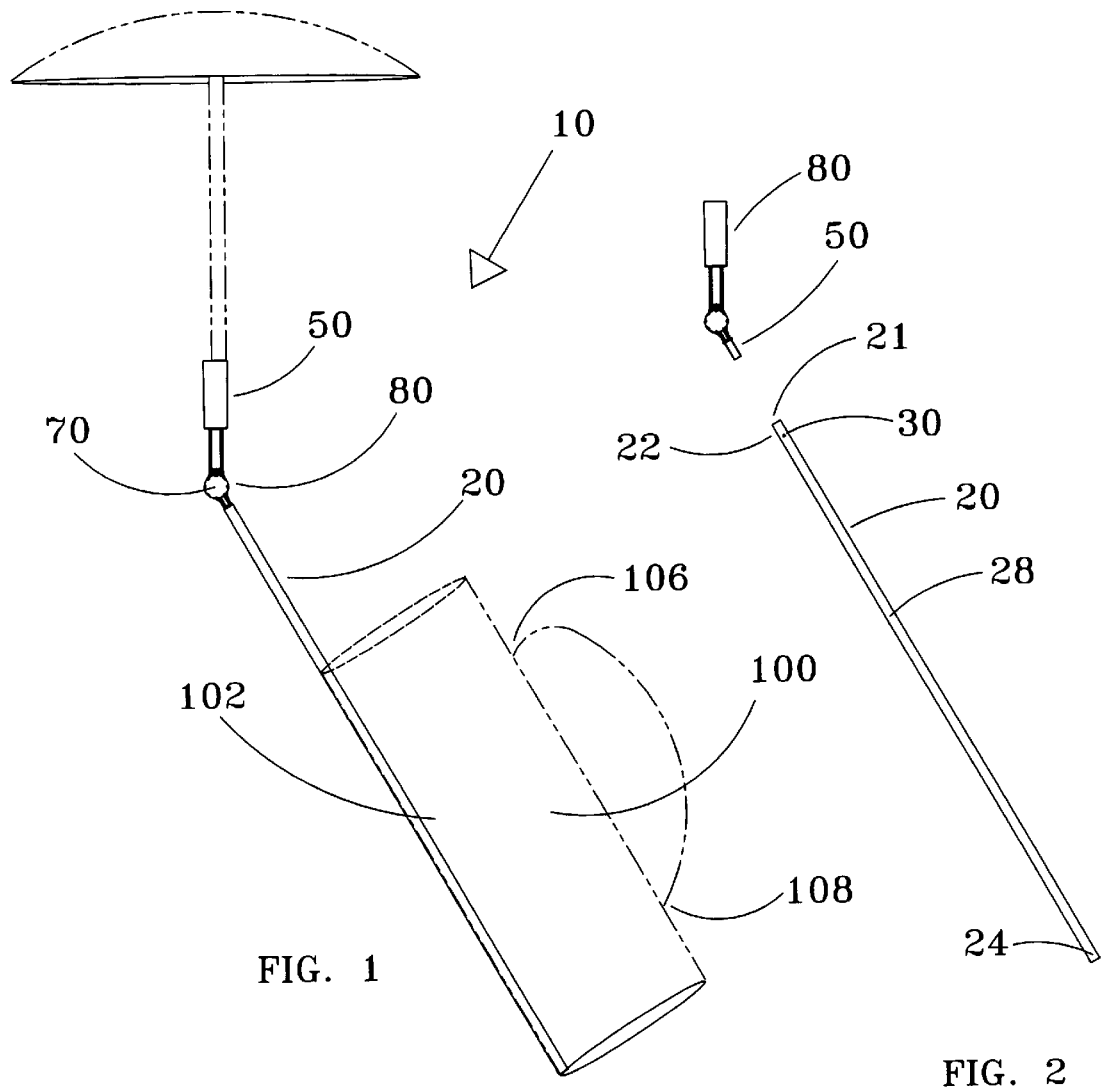

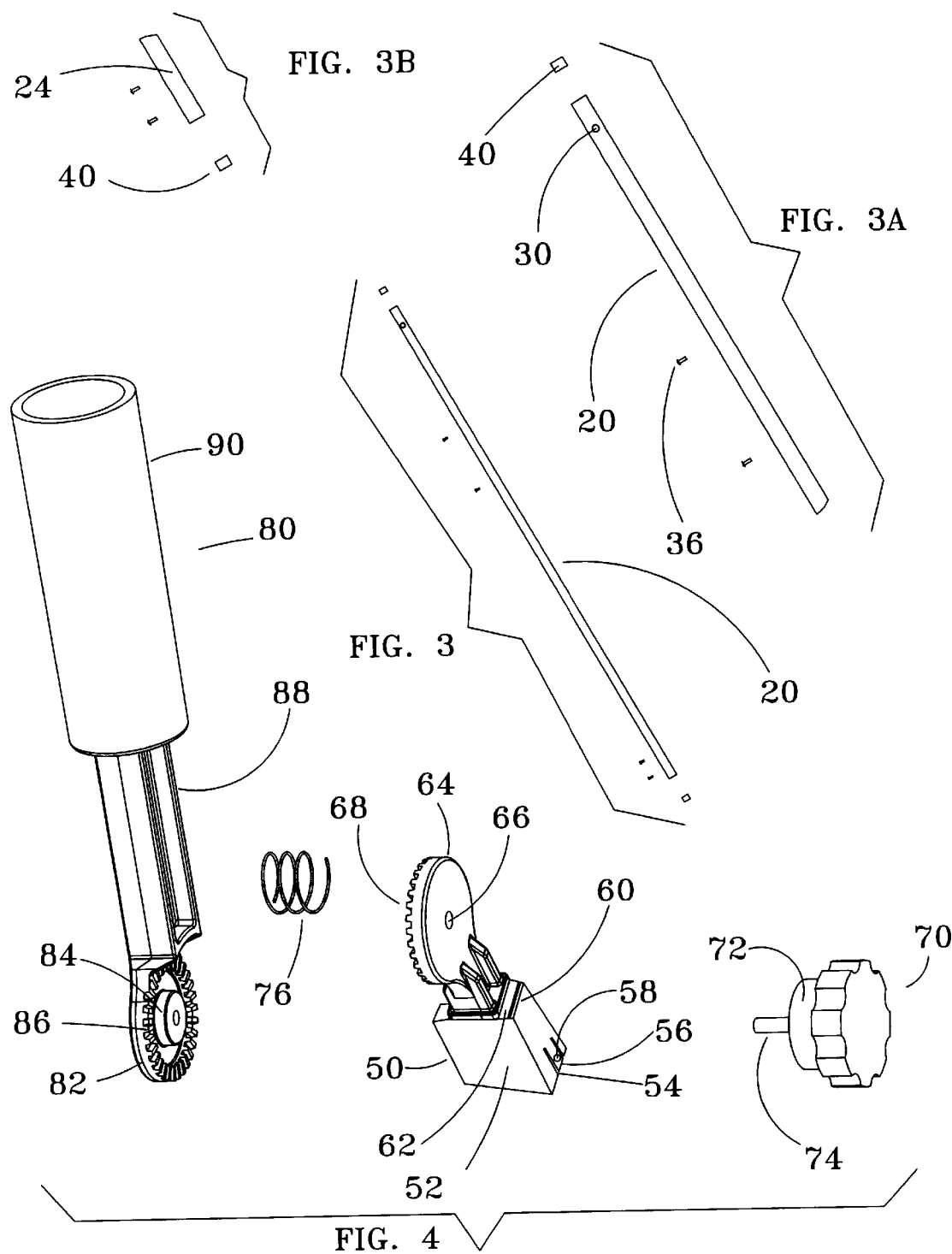

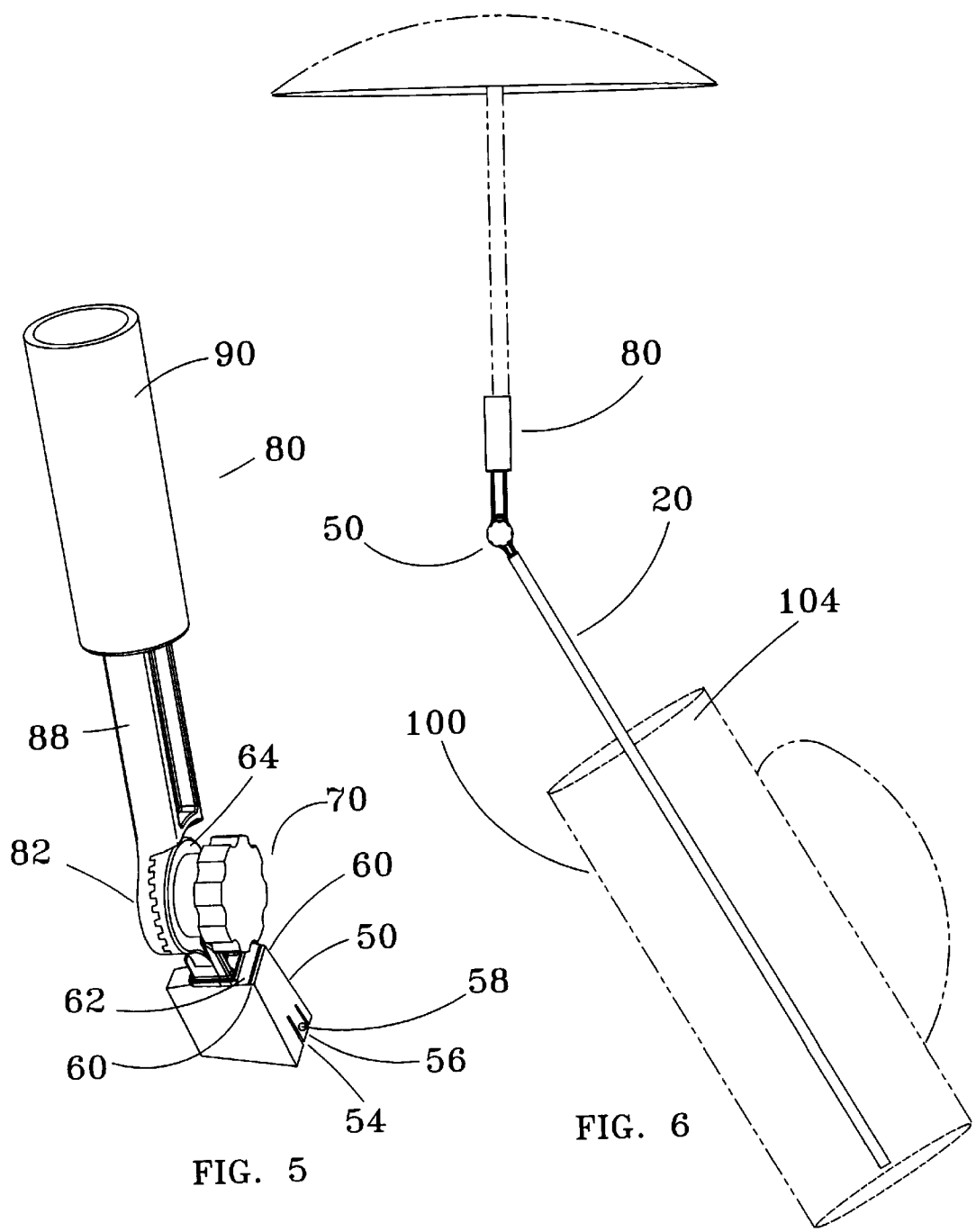

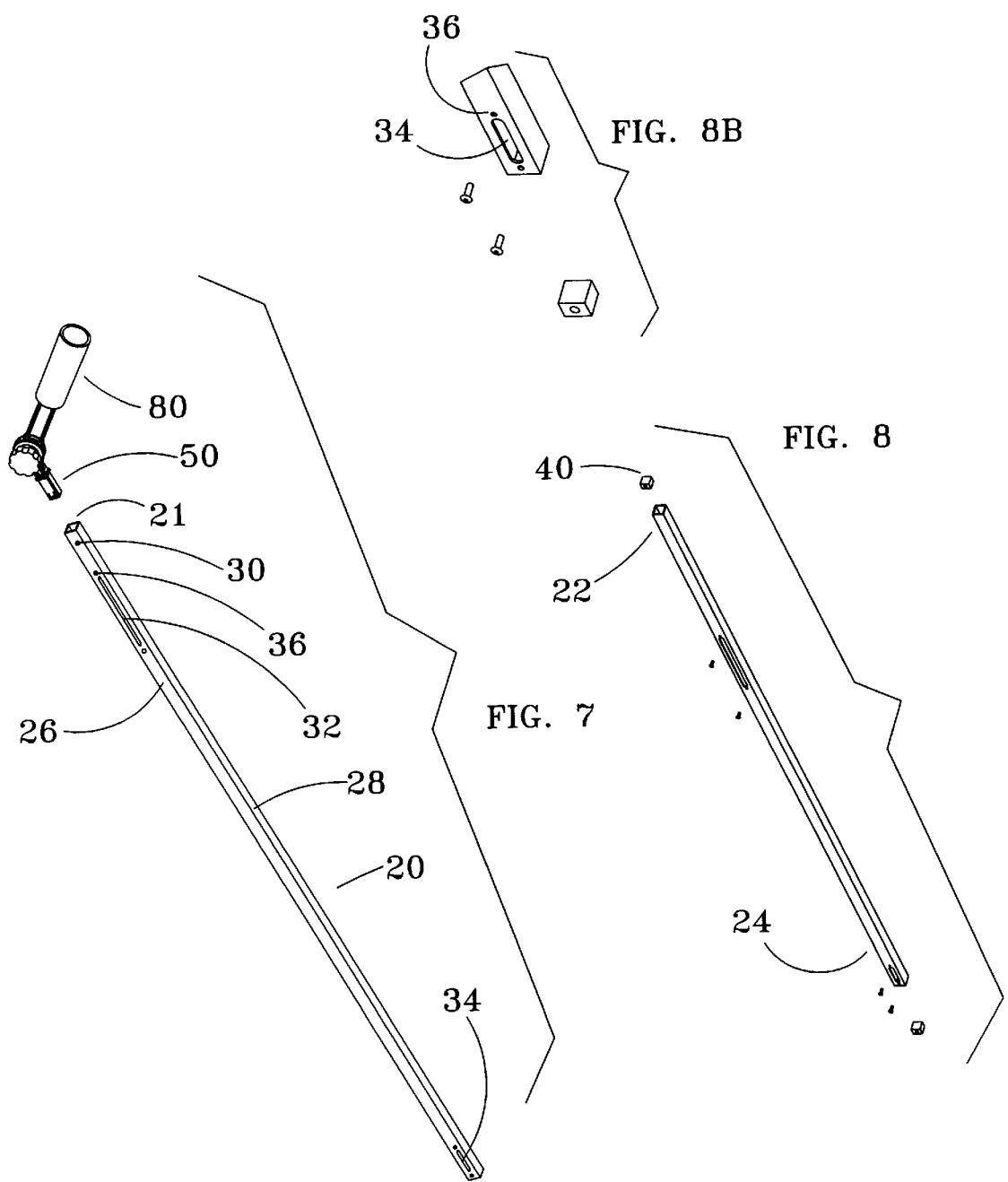

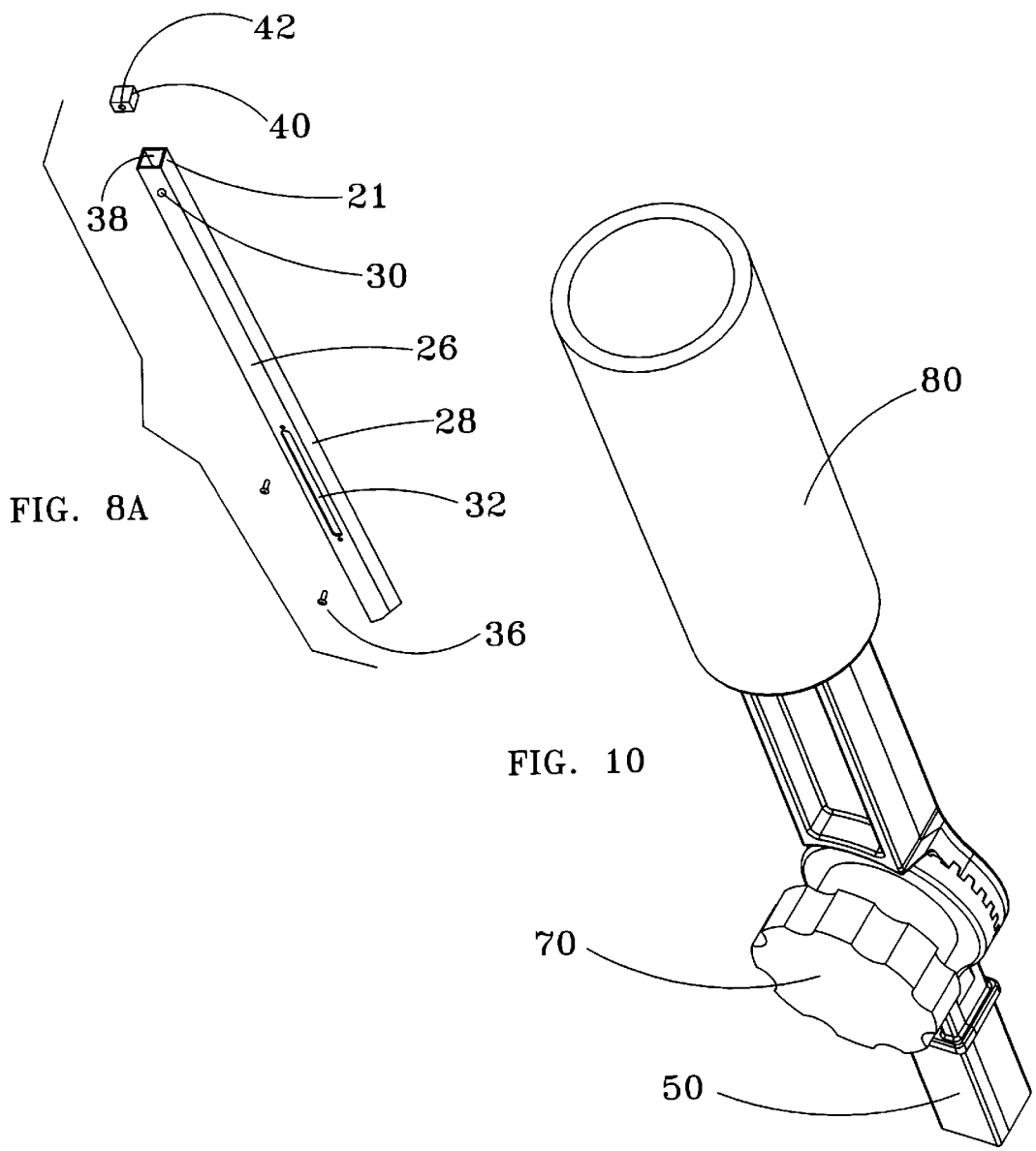

UMBRELLA HOLDER FOR A GOLF BAG

CROSS-REFERENCES

The present application is a continuation of provisional U.S. patent application Ser. No. 60/028,466, filed Oct. 11, 1996.

BACKGROUND

The present invention relates to a device attachable to a golf bag for holding an umbrella over the golf bag.

On days when the sun is shining brightly or when it is raining, it is desirable to have an umbrella over a golf bag, to provide shade from the sun or protection from the rain. Over-sized golf umbrellas are well-known, and provide protection from both rain and sun. To support such an umbrella, it is known to use an apparatus having attachment means for connection to a golf bag and having attachment means for supporting an umbrella.

Unfortunately, known umbrella holders have failed to adequately disclose a structure that will support a large umbrella rigidly during windy conditions. Similarly, known umbrella holders have failed to adequately disclose a structure that supports easy attachment and removal of the umbrella support and umbrella, while leaving installed the rigid support structure. Additionally, known umbrella holders have failed to adequately disclose a structure that allows convenient one-handed operation of the adjustment means for adjusting the angle of the umbrella support. Similarly, known umbrella holders have failed to disclose a structure that biases apart radially distributed teeth used to facilitate the adjustment of the angle of support.

For the foregoing reasons, there is a need for an umbrella holder for a golf bag that can rigidly support an umbrella; that allows easy removal and installation of the umbrella, while leaving installed the rigid support structure; that allows convenient one-handed adjustment of the angle of support of the umbrella; and that biases apart the radially distributed teeth used to facilitate the adjustment of the angle of support.

SUMMARY

The present invention is directed to a novel umbrella holder for a golf bag that rigidly supports an umbrella, allows easy removal and installation of the umbrella, while leaving installed the rigid support structure, allows convenient one-handed adjustment of the angle of support of the umbrella and biases apart the radially distributed teeth used to facilitate the adjustment of the angle of support.

The novel umbrella holder for a golf bag of the present invention provides some or all of the following structures.
(A) A support rod is typically made of hollow aluminum tubing, having a length-wise axial chamber and rectangular cross-section. The support rod is adapted for attachment to upper and lower locations on the golf bag, typically to the bag's upper and lower reinforced rims. The support rod is sized so that an upper portion extends out of the upper opening in the golf bag, and a lower portion of the support rod extends the full length of the bag. The details of a preferred version of the support rod, which allow adjustable installation on a variety of golf bags, include:
  (a) An upper end defining an upper adjustment slot bounded by first and second travel limiters.
  (b) An upper fastening block, sized to slide within the axial chamber of the support rod adjacent to the upper adjustment slot between the first and second travel limiters. The upper fastening block includes a threaded hole aligned with the upper adjustment slot, which is adapted to receive a bolt carried by an upper rim of the golf bag.
  (c) An lower end defining a lower adjustment slot bounded by third and fourth travel limiters.
  (d) A lower fastening block, sized to slide within the axial chamber adjacent to the lower adjustment slot between the third and fourth travel limiters. The lower fastening block includes a threaded hole aligned with the lower adjustment slot, which is adapted to receive a bolt carried by an lower rim of the golf bag.
(B) An adjustment support is releasably attachable to the support rod, allowing the adjustable support and attached umbrella support to be removed from the support rod, which is more permanently attached to the golf bag. The adjustment support rigidly connects to the support rod and pivotably connects to the umbrella support. The adjustment support typically includes:
  (a) An insert body is sized to insert into and fasten to the support rod.
  (b) A disk body which defines a central hole and carries a number of radially distributed teeth about a perimeter of the disk body.
(C) The umbrella support includes:
  (a) A disk body has a central collar which typically carries a threaded insert. A plurality of radially distributed teeth are carried about a perimeter of the disk body, and are adapted for connection to the radially dstributed teeth carried by the disk body of the adjustment support.
  (b) A shaft extends upwardly from an edge portion of the disk body.
  (c) A cylindrical holder has a hollow interior adapted for support of the handle of an umbrella and is carried by the shaft.
(D) A tightening knob carries a bolt which extends through the central hole of the disk body of the adjustment support and into the threaded insert of umbrella support.
(E) A spring, carried between the disk body of the adjustment support and the disk body of the umbrella support, biases the disk body of the adjustment support and the disk body of the umbrella support apart. When the user to loosens the tightening knob, the spring separates the teeth of the disk body of the adjustment support and the teeth of the disk body of the umbrella support, allowing the angle of adjustment between the adjustment support and the umbrella support to be altered.

It is therefore a primary advantage of the present invention to provide a novel umbrella holder for a golf bag that rigidly supports an umbrella without damaging or stressing the golf bag, even in circumstances where the bag itself is not rigid.

Another advantage of the present invention is to provide a umbrella holder for a golf bag that allows easy and adjustable installation of the support rod, even in golf bags of differing heights and construction.

Another advantage of the present invention is to provide a umbrella holder for a golf bag that allows easy removal and installation of the umbrella, adjustment support and umbrella support while leaving the rigid support structure installed on the golf bag.

A still further advantage of the present invention is to provide a umbrella holder for a golf bag that provides protection against stripping or damaging the radially distributed teeth used to facilitate the adjustment of the angle of support, in a manner that allows for convenient one-handed adjustment of the angle of support of the umbrella.

DRAWINGS

These and other features, aspects, and advantages of the present invention will become better understood with regard to the following description, appended claims, and accompanying drawings where:

FIG. 1 is a side isometric view of a version of the umbrella holder for a golf bag of the invention, attached to a forward portion of the golf bag;

FIG. 2 is a partially exploded view of the umbrella holder of FIG. 1, having the golf bag removed, to more clearly show the structure of the umbrella holder;

FIG. 3 is an exploded view of the support rod associated with the version of the invention of FIG. 1;

FIG. 3A is an enlarged view of a portion of the support rod of FIG. 3;

FIG. 3B is an enlarged view of a portion of the support rod of FIG. 3;

FIG. 4 is an enlarged exploded view of the adjustment support, tightening knob and umbrella support of the umbrella holder of FIG. 1;

FIG. 5 is a view of the elements of FIG. 4 in an assembled form;

FIG. 6 is a side isometric view of a second version of the umbrella holder for a golf bag of the invention, attached to a side portion of the golf bag.

FIG. 7 is a partially exploded view of the umbrella holder of FIG. 6, having the golf bag removed, to more clearly show the structure of the umbrella holder;

FIG. 8 is an exploded view of the support rod of the version of the invention of FIG. 6;

FIG. 8A is an enlarged view of a portion of the support rod of FIG. 8;

FIG. 8B is an enlarged view of a portion of the support rod of FIG. 8;

FIG. 10 is a view of the elements of FIG. 9 in an assembled form.

DESCRIPTION

Figure 9:
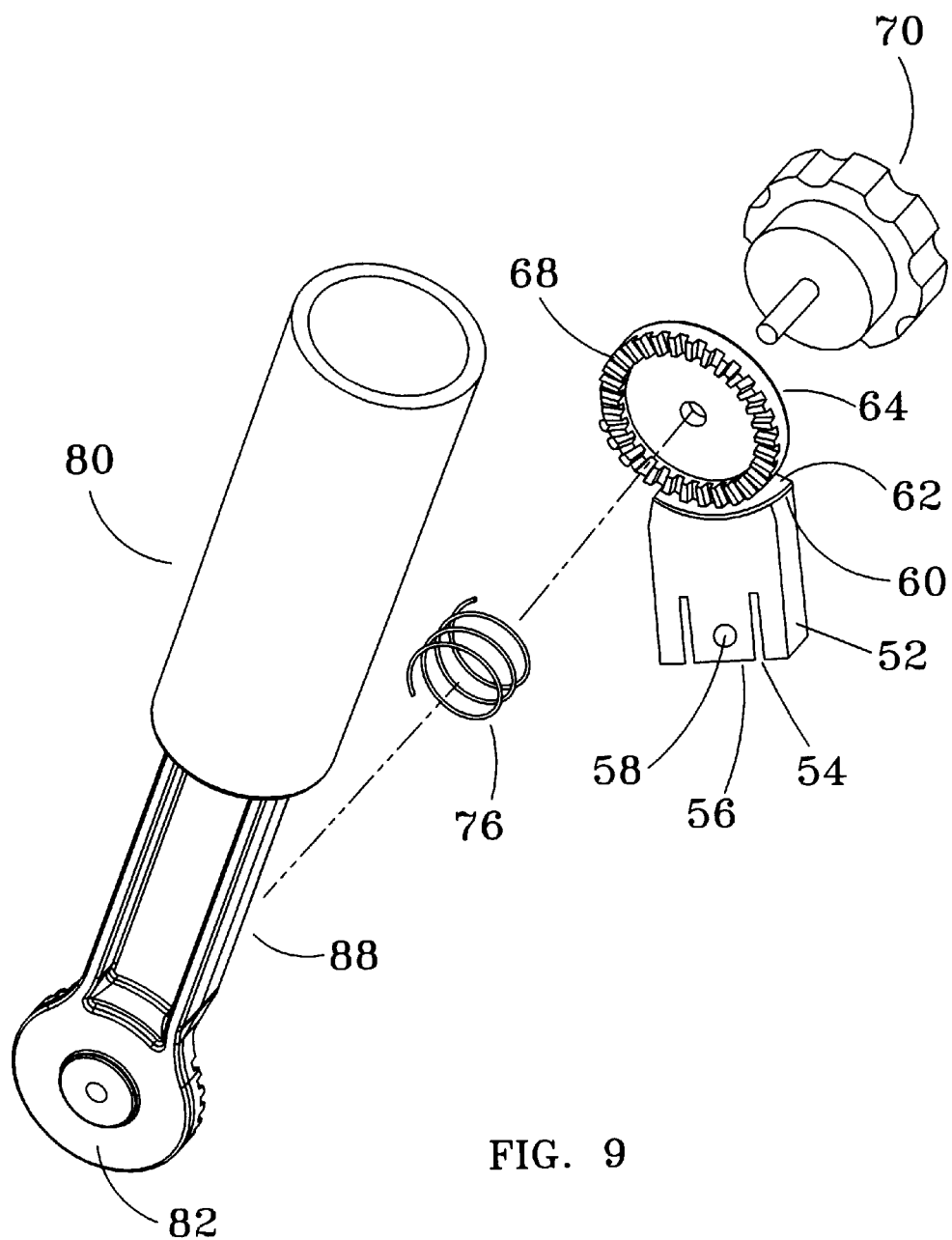
FIG. 9 is an enlarged exploded view of the adjustment support, tightening knob and umbrella support of the umbrella holder of FIG. 6.

Referring in generally to FIGS. 1–10, an umbrella holder for a golf bag constructed in accordance with the principles of the invention is seen. A preferred version of the umbrella holder 10 provides a support rod 20 which adjusts to attach to the inside of a golf bag 100. An adjustment support 50 is releasably attachable to the support rod, thereby allowing the golf bag to be used with only the support rod attached when use of the umbrella is not desired. An umbrella support 80 is pivotably adjustable with respect to the adjustment support, allowing the angle of the umbrella handle to be altered, as desired, and to compensate for the angle of the golf bag when supported by its legs or cart.

Referring particularly to FIGS. 1–3, a preferred version of the support rod 20 of the invention is seen. The support rod provides an upper end 22 and a lower end 24. In a preferred version, the support rod is made of hollow aluminum tubing of rectangular cross-section, having broad and narrow side surfaces 26, 28.

The support rod is releasably attachable to the adjustment support 50 by use of a pair of upper fastener holes 30 or other fastening means as will be further described. In the preferred version of the invention, as seen in FIG. 3, the fastening holes are defined in the narrow side surface 28. In a second version of the invention, as seen in FIG. 8, the fastening holes are defined in the broad side surface 26.

In the preferred version of the invention, the broad side surface 26 of the support rod 20 defines an upper adjustment slot 32 and a lower adjustment slot 34. Each adjustment slot is associated with a fastening block 40, which travels within the axial channel 38 of the hollow support rod 20. A threaded hole 42, defined within the fastening block, is aligned with the adjustment slot. By moving the fastening block within the axial channel, the threaded hole may be located in any desired location behind the adjustment slot 34.

Both adjustment slots are bounded at each end by travel limiters 36, which prevent movement of the fastening blocks 40 to areas of the axial channel within the support rod not adjacent to the adjustment slots 32, 34. The travel limiters which may take the form of pop rivets or other means for partially obstructing the axial channel 38 within the support rod 20.

An adjustment support 50 is releasably attachable to an upper portion of the support rod 20. In a preferred embodiment, the adjustment support is formed of plastic, including ABS or similar materials. An insert body 52 of the adjustment support is typically inserted into the open top end 21 of the hollow support rod 20. As seen in particular in FIGS. 4 and 5, notches 54 define a spring board 56 carrying a protrusion 58 which is sized for insertion into the upper fastener holes 30 of the upper portion 22 of the support rod 20.

A shoulder 60 is sized to sit on the rim of the opening 21 of the support rod, and carries a neck 62 which is turn carries a disk body 64. As seen in FIGS. 4 and 5, the disk body defines a central hole 66 and carries a plurality of radially distributed teeth 68.

Referring to FIGS. 6–10, a second version of the invention is very similar to the first, but is adapted for installation on the side of the golf bag, rather than the front or back of the golf bag. A comparison of FIGS. 1 and 6 reveals this difference.

By referring to the illustration of the first version of the invention in FIGS. 4 and 5, it can be seen that the structure of the neck 62 of the adjustment support 50 holds the disk body 64 perpendicular to the broad side surface 26 of the support rod 20. This allows the broad side surface 26 to be attached to the front or back of the golf bag, as seen in FIG. 1. This results in a more stable bag, with the weight distributed along a plane of symmetry with respect to the wheels or legs supporting the bag.

As seen in FIGS. 4 and 5, in this version of the invention, the spring board 56 and protrusion 58 are carried on the side of the adjustment support, and engage upper fastener holes 30 defined in the narrow side surface 28 of the support rod.

In contrast, by referring to the illustration of the second version of the invention in FIGS. 9 and 10, it can be seen that the structure of the neck 62 of the adjustment support holds the disk body 64 in parallel to the broad side surface 26 of the support rod 20. This requires the broad side surface 26 to be attached to the left or right side of the bag to allow the angle of the umbrella to be adjusted in the front-to-back direction. However, this results in a stronger adjustment support 50, wherein there is more contact between the disk and neck.

Also, as seen in FIGS. 4 and 5, in this version of the invention, the spring board 56 and protrusion 58 are carried on the front and back of the adjustment support, and engage upper fastener holes 30 defined in the broad side surfaces 26 of the support rod.

As seen in FIGS. 4 and 5, an umbrella support 80 attaches to the adjustment support and carries the handle portion of an umbrella. In a preferred embodiment, the umbrella support is formed of plastic, including ABS or similar materials. The umbrella support provides a disk body 82 sized to mate with the disk body 64 of the adjustment support. The disk body supports a centrally located collar 84 carrying a threaded sleeve. The perimeter of the disk body carries a plurality of radially distributed teeth 86 sized and dimensioned for adjustable attachment to the teeth 68 carried by the adjustment support. A shaft 88 extends from a portion of the perimeter of the disk body 82. It is typically the case that the length of the shaft 88 is minimized to reduce the leverage on the connection between the disk bodies 64, 82, but this is not required where quality materials and construction techniques are used.

A hollow cylindrical holder 90 is carried by an upper portion of the shaft 88. The cylindrical holder is open on the upper end, allowing the handle of an umbrella to be inserted into the holder, as seen in FIGS. 1 and 6. The inside dimensions of the cavity within the cylindrical holder should be chosen to cause a firm fit with the handle of the umbrella. Optionally, inserts may be used to lessen the diameter of the cavity within the cylindrical holder, if desired, to adapt it to a small umbrella handle.

A tightening knob 70 is used to tighten the disk bodies 64, 82 together. As seen in FIGS. 4 and 5, the tightening knob provides a shoulder 72 which rests on the outside surface of the disk body 64 of the adjustment support 60 and a bolt 74 which is threaded into an insert carried within the collar 84 of the umbrella support 80.

A spring 76 is carried between the disk body 64 of the adjustment support 50 and the disk body 82 of the umbrella support 80. The spring tends to push the two disk bodies apart; as a result when the tightening knob is loosened, the disk bodies separate somewhat, disengaging the teeth 68, 86, allowing the angle between the disk bodies to be altered without difficulty.

To install the support rod 20 of the version of the invention seen in FIG. 1, in a golf bag 100, the user first determines whether it has been customary to "address the bag", i.e. access and replace clubs, from the front or back of the bag. This may depend on a variety of factors, including the manner of support of the bag, i.e. self-supporting bags with legs, bags on wheeled carts, etc. For example, if the user typically addresses the bag from the rear, then the umbrella support should be installed on the front, as seen in FIG. 1.

The user then installs the support rod 20 by drilling one hole each in the hard plastic upper and lower rims present in most golf bags. The support rod 20 is then inserted into the bag and bolts are fed through the newly drilled holes into the threaded holes 42 defined in the fastening blocks 40 carried behind the upper and lower adjustment slots 30, 32. The fastening blocks 40 may be slid, as desired, between the travel limiters 36, to align with the newly drilled holes in the golf bag.

The adjustment support 50 is then inserted into the open top end 21 of the support rod, causing the protrusions 58 of the adjustment support 50 to snap into the upper fastener holes 30 of the support rod 20.

The umbrella support 80 is then attached to the adjustment support 50 by aligning the disk bodies 64, 82, with the spring 76 carried between them, thereby engaging the teeth 68, 86. The bolt 74 carried by the tightening knob 70 is then fed through the hole 66 and threaded onto the threaded sleeve carried within the collar 84.

To adjust the angle between the adjustment support 50 and the umbrella support 80, the user loosens the tightening knob, which allows the spring 76 to separate the disk bodies 64, 82. The angle is then easily adjusted, and the tightening knob re-tightened, thereby engaging the teeth 68, 86 and compressing the spring 76.

The previously described versions of the present invention have many advantages, including a primary advantage of providing a novel umbrella holder for a golf bag that rigidly supports an umbrella without damaging or stressing the golf bag, even in circumstances where the bag itself is not rigid.

Another advantage of the present invention is to provide a umbrella holder for a golf bag that allows easy and adjustable installation of the support rod, even in golf bags of differing heights and construction.

Another advantage of the present invention is to provide a umbrella holder for a golf bag that allows easy removal and installation of the umbrella, adjustment support and umbrella support while leaving the rigid support structure installed on the golf bag.

A still further advantage of the present invention is to provide a umbrella holder for a golf bag that provides protection against stripping or damaging the radially distributed teeth used to facilitate the adjustment of the angle of support, in a manner that allows for convenient one-handed adjustment of the angle of support of the umbrella.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible, particularly including substitution of the specific hardware used to implement the invention. For example, while the preferred version provides a threaded sleeve within the collar 84 of the umbrella support, it is clear that a nut or other fastening hardware could be substituted. Also, the orientation of the tightening knob 70 is arbitrary, in that it could be inserted from either direction. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An umbrella holder, adapted for attachment to a golf bag and to the handle of an umbrella, the umbrella holder comprising:

(A) a support rod, having an axial channel, the support rod being adapted for attachment to upper and lower locations on the golf bag, and wherein an upper portion of the support rod is adapted to be sized to extend out of an upper opening in the golf bag and wherein a lower portion of the support rod is adapted to be sized to extend from an upper portion of the golf bag to a lower portion of the golf bag, wherein the support rod further comprises:
- (a) an upper end defining an upper adjustment slot;
- (b) an upper fastening block, sized to slide within the axial channel of the support rod adjacent to the upper adjustment slot, the upper fastening block defining a threaded hole aligned with the upper adjustment slot;

(B) adjustment support means, releasably attachable to the support rod, for rigidly connecting to the support rod and to an umbrella support means, the adjustment support means comprising:
- (a) an insert body, having fastening means for attachment to the support rod; and
- (b) a disk body, carried by the insert body, having a plurality of radially distributed teeth about a perimeter of the disk body;

(C) the umbrella support means comprising:
- (a) a disk body having a plurality of radially distributed teeth adapted for connection to the radially distributed teeth carried by the disk body of the adjustment support means; and
- (b) a cylindrical holder, having a hollow interior adapted for support of the handle of the umbrella, carried by the disk body, whereby the handle of the umbrella may be easily inserted and removed;

(D) tightening knob means, carried by the adjustment support means and the umbrella support means, for tightening the two together; and (E) spring biasing means, carried between the disk body of the adjustment support means and the disk body of the umbrella support means, for biasing the two apart.

2. An umbrella holder, adapted for attachment to a golf bag and to the handle of an umbrella, the umbrella holder comprising:

(A) a support rod, having an axial channel, the support rod being adapted for attachment to upper and lower locations on the golf bag, and wherein an upper portion of the support rod is adapted to be sized to extend out of an upper opening in the golf bag and wherein a lower portion of the support rod is adapted to extend from an upper portion of the golf bag to a lower portion of the golf bag, the support rod comprising:
- (a) an upper end defining an upper adjustment slot bounded by first and second travel limiters;
- (b) an upper fastening block, sized to slide within the axial channel of the support rod adjacent to the upper adjustment slot between the first and second travel limiters, the upper fastening block defining a threaded hole aligned with the upper adjustment slot;
- (c) a lower end defining a lower adjustment slot bounded by third and fourth travel limiters; and
- (d) a lower fastening block, sized to slide within the axial channel of the support rod adjacent to the lower adjustment slot between the third and fourth travel limiters, the lower fastening block defining a threaded hole aligned with the lower adjustment slot;

(B) adjustment support means, releasably attachable to the support rod, for rigidly connecting to the support rod and to an umbrella support means, the adjustment support means comprising:
- (a) an insert body, having fastening means for attachment to the support rod; and
- (b) a disk body, carried by the insert body, having a plurality of radially distributed teeth about a perimeter of the disk body;

(C) the umbrella support means comprising:
- (a) a disk body having a plurality of radially distributed teeth adapted for connection to the radially distributed teeth carried by the disk body of the adjustment support means; and
- (b) a cylindrical holder, having a hollow interior adapted for support of the handle of an umbrella, carried by the disk body;

(D) tightening knob means, carried by the adjustment support means and the umbrella support means, for tightening the two together; and (E) spring biasing means, carried between the disk body of the adjustment support means and the disk body of the umbrella support means, for biasing the two apart.

3. An umbrella holder, adapted for attachment to a golf bag and to the handle of an umbrella, the umbrella holder comprising:

(A) a support rod, having an axial channel, the support rod being adapted for attachment to upper and lower locations on the golf bag, and wherein an upper portion of the support rod is adapted to be sized to extend out of an upper opening in the golf bag and wherein a lower portion of the support rod is adapted to be sized to extend from an upper portion of the golf bag to a lower portion of the golf bag, wherein the support rod comprises:
- (a) a lower end defining a lower adjustment slot bounded by first and second travel limiters; and
- (b) a lower fastening block, sized to slide within the axial channel of the support rod adjacent to the lower adjustment slot between the first and second travel limiters, the lower fastening block defining a threaded hole aligned with the lower adjustment slot;

(B) adjustment support means, releasably attachable to the support rod, for rigidly connecting to the support rod and to an umbrella support means, the adjustment support means comprising:
- (a) an insert body, having fastening means for attachment to the support rod; and
- (b) a disk body, carried by the insert body, defining a central hole and having a plurality of radially distributed teeth about a perimeter of the disk body;

(C) the umbrella support means comprising:
- (a) a disk body, having a central collar carrying a threaded insert and having a plurality of radially distributed teeth about a perimeter of the disk body adapted for connection to the radially distributed teeth carried by the disk body of the adjustment support means;
- (b) a shaft, extending from an edge portion of the disk body; and
- (c) a cylindrical holder, having a hollow interior adapted for support of the handle of an umbrella, carried by the shaft;

(D) a tightening knob, carrying a bolt extending through the central hole of the disk body of the adjustment support means and into the threaded insert of umbrella support means; and (E) spring biasing means, carried between the disk body of the adjustment support means and the disk body of the umbrella support means, for biasing the two apart.

* * * * *